(12) United States Patent
Chan et al.

(10) Patent No.: US 10,057,419 B2
(45) Date of Patent: Aug. 21, 2018

(54) INTELLIGENT CALL SCREENING

(71) Applicant: INTERNATIONAL BUSINESS MACHINES CORPORATION, Armonk, NY (US)

(72) Inventors: Yuk L. Chan, Rochester, NY (US); Heidi Lagares-Greenblatt, Jefferson Hills, PA (US); Deepti M. Naphade, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/362,850

(22) Filed: Nov. 29, 2016

(65) Prior Publication Data
US 2018/0152558 A1 May 31, 2018

(51) Int. Cl.
*H04M 3/42* (2006.01)
*H04M 3/436* (2006.01)
*H04W 4/16* (2009.01)

(52) U.S. Cl.
CPC ............. *H04M 3/436* (2013.01); *H04W 4/16* (2013.01)

(58) Field of Classification Search
CPC ................................ H04M 3/436; H04W 4/16
USPC ...................................................... 379/201.02
See application file for complete search history.

(56) References Cited

U.S. PATENT DOCUMENTS

| 8,831,192 | B1 | 9/2014 | Clarke |
| 2004/0213396 | A1 | 10/2004 | MacNamara et al. |
| 2005/0271196 | A1 | 12/2005 | Florkey et al. |
| 2006/0029189 | A1 | 2/2006 | Patel et al. |
| 2006/0147014 | A1 | 7/2006 | Smith et al. |
| 2007/0197233 | A1 | 8/2007 | Feng |
| 2007/0201660 | A1* | 8/2007 | Lan ...................... H04M 3/436 379/201.01 |
| 2009/0103701 | A1 | 4/2009 | Garg et al. |
| 2015/0172460 | A1 | 6/2015 | Foss |

(Continued)

FOREIGN PATENT DOCUMENTS

EP 1691538 A1 8/2006

OTHER PUBLICATIONS

O'Reilly, "Screen unwanted calls without one-at-a-time blocking," CNET, Security, https://www.cnet.com/how-to/screen-unwanted-calls-without-one-at-a-time-blocking/, Printed on Sep. 6, 2016, pp. 1-10.

(Continued)

*Primary Examiner* — Quynh Nguyen
(74) *Attorney, Agent, or Firm* — Michael O'Keefe (57) ABSTRACT

A computer receives an incoming call by a cognitive computing service. The computer determines, by the cognitive computing service (CCS), caller details that the incoming call is not within intended recipient preferences, based on comparing the caller details to call log information database and call information database, wherein the call log information database and call information database comprises previous caller details. The computer references, by the CCS, additional caller details from the call log information database and call information database relating to the caller details. The computer determines whether an intended recipient of the incoming call would reject the incoming call and based on the computer determination that the intended recipient of the incoming call would reject the incoming call the computer rejects the incoming call.

20 Claims, 7 Drawing Sheets

(56) References Cited

U.S. PATENT DOCUMENTS

2015/0189082 A1 7/2015 Pfeffer et al.
2016/0219150 A1 7/2016 Brown
2017/0104875 A1* 4/2017 Im ..................... H04M 3/5191

OTHER PUBLICATIONS

Tobin, "Social Network Profile Searches by Cell Phone Number," New Orleans Social Media Consulting, Conversations, http://www.neworleanssocialmediaconsulting.com/social-network-profile-searches-by-cell-phone-number!, Jun. 6, 2014, pp. 1-4, Printed on Sep. 6, 2016.
Tech News Daily, "Facebook lists user phone numbers for all to see," Fox News, Tech, http://www.foxnews.com/tech/2012/10/10/facebook-lists-user-phone-numbers-for-all-to-see.html, Published Oct. 10, 2012, pp. 1-7, Printed on Sep. 6, 2016.
Tu et al., "SoK: Everyone Hates Robocalls: A Survey of Techniques against Telephone Spam," 2016 IEEE Symposium on Security and Privacy, Copyright 2016, Huahong Tu, Under license to IEEE, IEEE Computer Society, pp. 320-338.
Mell et al., "The NIST Definition of Cloud Computing," Recommendations of the National Institute of Standards and Technology, U.S. Department of Commerce, Special Publication 800-145, Sep. 2011, pp. 1-7.

\* cited by examiner

INTELLIGENT CALL SCREENING

BACKGROUND

The present invention relates generally to filtering spam calls, and more particularly to call screening using cognitive computing platforms.

Cognitive computing systems are systems configured to simulate the human thought process in a computerized model. Cognitive computing platforms (CCPs) mimic the way the human brain works and encompass machine learning, reasoning, natural language processing, speech and vision processing, human-computer interaction, and dialog and narrative generation in order to improve or substitute for human decision making.

SUMMARY

Embodiments of the present invention provide a system, method, and program product for an intelligent call screening. A computer receives an incoming call by a cognitive computing service. The computer determines, by the cognitive computing service (CCS), caller details that the incoming call is not within intended recipient preferences, based on comparing the caller details to call log information database and call information database, wherein the call log information database and call information database comprises previous caller details. The computer references, by the CCS, additional caller details from the call log information database and call information database relating to the caller details. The computer determines whether an intended recipient of the incoming call would reject the incoming call and based on the computer determination that the intended recipient of the incoming call would reject the incoming call the computer rejects the incoming call.

DETAILED DESCRIPTION

Receipt of spam calls, such as advertisements or unwanted calls, is a well-known problem for a smartphone user. Typical solutions to spam calls screening use static information (i.e. if a call number is on the blacklist or "no call" list the smartphone rejects the call), therefore such solutions do not adapt to changing circumstances, such as phone number changes or emergency situations such as when an auto-dialer calls from multiple lines with a pre-recorded message. An example of a static solution is a program accepting only calls from an identifiable number that is saved in the phonebook of a smartphone.

A CCP may be configured to receive a call, identify a caller by asking questions and learn intended recipient (user) preferences by analyzing intended recipient answers and responses. In addition, a CCP may determine caller identity by voice signature comparison to stored voice signature templates of previous callers. Further, a CCP may decide to reject a call and send caller details with recommendations to a user and either receive the incoming call or block the call based on analyzing past user behavior. Past user behavior may be inferred from user preferences, defined by the user or determined from user responses during the same or similar calls. For example, user preferences may be determined by analyzing call duration, by identifying an incoming caller voice and checking previous conversations with the same caller, by analyzing previous responses to the same phone number, and by determining the reason for a call (e.g. topic) by directly asking the caller questions and analyzing the caller's answers to the questions.

Figure 1:
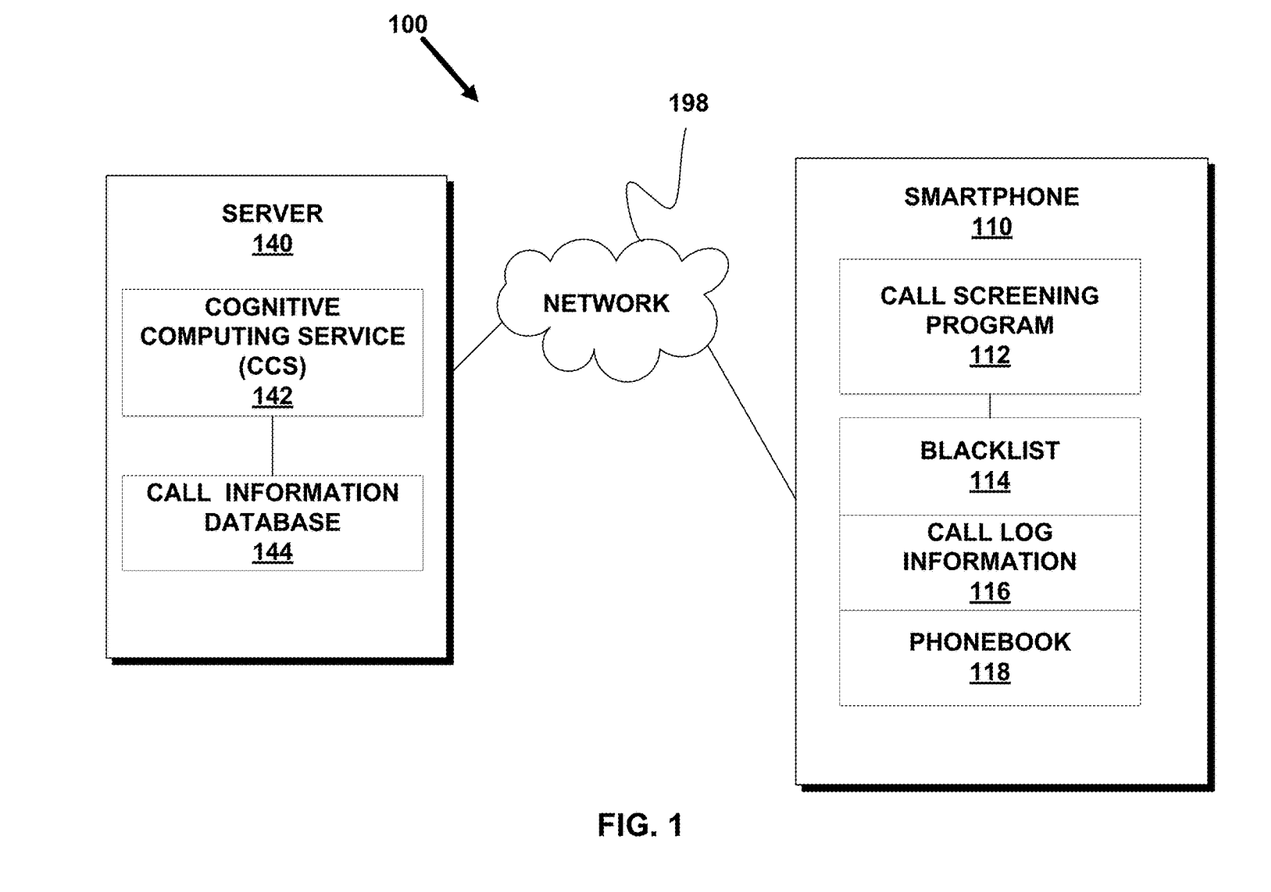
FIG. 1 illustrates an Intelligent Call Screening (ICS) system, in accordance with an embodiment of the invention.

FIG. 1 illustrates an Intelligent Call Screening (ICS) system 100 that is a configured CCP that receives an incoming call, classifies whether to block, to accept, or to start a conversation with a caller (i.e. to identify the caller and the reason for the call), and decides or recommends to accept or reject the incoming call. After the call is accepted or rejected, ICS system 100 analyzes user responses to update user preferences, in accordance with an embodiment of the invention.

In an example embodiment, ICS system 100 comprises a smartphone 110 (configured to execute call screening program 112), and server 140 (configured to execute cognitive computing service 142) interconnected via network 198.

In accordance with an embodiment of the invention, network 198 is the Internet, representing a worldwide collection of networks and gateways to support communications between devices connected to the Internet. Accordingly, network 198 may include, for example, wired, wireless or fiber optic connections. In other embodiments, network 198 may be implemented as an intranet, a local area network (LAN), or a wide area network (WAN). In general, network 198 may be any combination of connections and protocols that will support communications between server 140 and smartphone 110.

According to an example embodiment, smartphone 110 represents a computing platform configured to receive and send calls. For example, smartphone 110 may be a mobile computer, a notebook, a laptop computer, a tablet computer, a handheld device, a smartphone, a thin client, or any other electronic device or computing system capable of receiving and sending calls, voice or video communications, and to send and receive data with server 140, via network 198. In an example embodiment, smartphone 110 may receive calls from other smartphones and screen incoming calls by communicating in real time with cognitive computing service (CCS) 142 and enabling CCS 142 to communicate with the caller via network 198. According to an example embodiment, smartphone 110 stores blacklist 114, call log information 116, and phonebook 118 in a persistent memory.

According to an example embodiment, blacklist 114 is a database containing details on callers that the user is unwilling to talk to. Caller details may be organized in accounts where each account includes caller identification information that includes identification parameters that are transferred with a call such as caller phone number, caller name, caller email, caller identification, or other caller identification parameters that are transferred with a call. According to an example embodiment, blacklist 114 may be stored in the persistent memory of smartphone 110. Blacklist 114 may include different fields, such as caller phone number, name, email address, voice signature template, occupation, call topic or other fields that identify the caller. In another embodiment, blacklist 114 may be a list of phone numbers from which the user is unwilling to receive a call. In a further embodiment, blacklist 114 may be stored on server 140 or another server accessible via network 198.

According to an example embodiment, call log information 116 is a database that contains information related to incoming or outgoing calls of a user. Call log information 116 may include fields, such as caller phone number or VOIP identification, caller voice signature, caller name, topic (a reason for calling), a field for tagging a caller as a spammer, transcripts of the conversation, user responses (e.g., verbal and physical), user response value, date, time and duration of the call. According to an example embodiment, call log information 116 is located in the persistent memory of smartphone 110. In another embodiment, call log information 116 may be located on server 140 or another server and accessible via network 198. In further embodiments, call log information 116 may incorporate blacklist 114 and phonebook 118.

Phonebook 118 is a database configured to store, add, remove, and search phone numbers and other parameters that may help to identify the caller that the user prefers to preserve. According to an example embodiment, phonebook 118 is stored in a persistent memory of smartphone 110, and may include fields, such as phone number, email, name, voice signature template, topic, and occupation. In another embodiment, phonebook 118 may be stored on server 140 or other server accessible via network 198. In an example embodiment, the voice signature template may be a mathematical representation used to identify the voice of the caller. In an example embodiment, the topic may be one of a user or program predetermined words that classifies the intention or motivation of the caller, such as advertisement, work, doctor, family, insurance, sales, spam, or robot (i.e. an automatic calling platform).

Call screening program 112 is a program capable of receiving, sending, and displaying data and commands received from CCS 142 on smartphone 110. According to an example embodiment, call screening program 112 receives an incoming call and after deciding not to block or transfer it by comparing the caller number to internal databases connects the caller to CCS 142 for cognitive analysis. Call screening program 112 receives commands such as a report summarizing the communication of CCS 142 with a caller that includes commands or a recommendation whether to accept or reject a call and presents the recommendation to the user or decides to connect the call to a user or reject the call in accordance with the user preferences inferred from previous conversations and previous user behavior in same circumstances. According to an example embodiment, call screening program 112 logs incoming call information including phone number or VOIP identification, call date, time, and duration; user physical responses; conversation transcripts; user preferences; name of the caller; topic (i.e. reason for a call); user voice signature; and user verbal responses. The operations and functions of call screening program 112 are described in further detail below with regard to FIG. 2A.

According to an example embodiment, server 140 represents a platform configured to provide cognitive computing services (CCS) 142 via network 198. For example, server 140 may be a web server, file server, desktop computer, or any other electronic device or computing system capable of executing CCS 142. Although not shown, optionally, server 140 may comprise a cluster of servers. In an example embodiment, server 140 is a computing system that is optimized for processing machine learning, reasoning, natural language processing, speech, human-computer interaction, dialog and narrative generation in order to improve human decision making, particularly whether to accept or reject the incoming call.

According to an example embodiment, call information database 144 is a database that contains information related to incoming or outgoing calls of users that use the CCS 142 services. Call information database 144 may include fields, such as caller phone number or VOIP identification, caller voice signature, caller name, topic (a reason for calling), a field for tagging a caller as a spammer, transcripts of the conversation, transcripts of user responses, date, time, duration of calls, statistics including rejection percentage of the corresponding incoming call assigned to each topic, subtopic, user preferences, and voice signature. According to an example embodiment, call information database 144 is located on server 140. In another embodiment, call information database 144 may be located on smartphone 110, the cloud or other servers or smartphones and accessible via network 198. In further embodiments, call information database 144 may incorporate call log information 116, blacklist 114, and phonebook 118 that may be identified by a corresponding user identifier.

According to an example embodiment, CCS 142 is a software program that operates on server 140, and is configured to provide cognitive services to call screening program 112. CCS 142 may interact with a caller, listen to real time voice conversation, send and receive data, and perform cognitive analysis, that involves steps such as machine learning, reasoning, natural language processing, speech, human-computer interaction, dialog and narrative generation, to improve smartphone user decision making. According to an example embodiment, CCS 142 may participate in a conversation, and send and receive voice and call-related data stored on smartphone 110. According to an example embodiment, call screening program 112 sends and receives caller details to and from CCS 142, and CCS 142 directly connects to the incoming call voice stream of smartphone 110. Due to natural language processing capabilities, CCS 142 may analyze, record, transcribe, and classify a conversation by topic, subtopic and voice signature. In addition, by comparing the topic, subtopic and voice signature to databases, CCS 142 may determine whether the user would accept or reject the call. For example, CCS 142 may ask the caller for the reason of a call and the name of the caller, and, using speech-to-text capabilities, analyze answers and match or find similar data in call information database 144, call log information 116, phonebook 118, and blacklist 114. In another embodiment, CCS 142 may operate on smartphone 110 and be executed as a standalone program or as an integrated program of the call screening program 112.

According to the embodiment, the call screening may be performed by CCS 142. The CCS 142 may be a part of the phone service provider, an application configured to run on smartphone 110, an online voice service provider (such as Google™ Voice), or as a client and server computing approach involving the smartphone 110 as a client and a CCS 142 running in the cloud as a server. In another embodiment, such as the client and server computing approach, the client (such as smartphone 110) may be responsible for light weight processing, while the processing requiring significant resources or having significant battery consumption could happen in the cloud. In this approach, call screening program 112 performs speech-to-text conversion, and the resulting text is sent to CCS 142 for analytic modeling.

In another embodiment, call information database 144 may be a part of a social network or operating as a social networking platform. For example, all the data related to the callers, such as call log information 116 from user A, is shared in call information database 144 located on the social network platform. When user B receives a call, CCS 142 compares the caller details to the corresponding account on call information database 144 that was previously updated on the social network platform with call data from user A. If for example user A tagged a topic as spam, then CCS 142, when analyzing the incoming call on a user B device, will transmit a report with a recommendation (a decision) to reject the call or actively block receipt of the call because this caller was identified as a spammer by other users on the social network platform. The call information database 144 allows an automated identification of callers even when random phone numbers are used, or in the case when multiple distinct telemarketing callers follow the same transcript of the phone conversation.

In another embodiment, call information database 144 may include user defined subsets or filters for different topics and subtopics. For example, if a user supports a fire department and accepts donation calls from the fire department, the user may adjust the settings for CCS 142 to filter the call information database 144 based on the specified topic such as donation for the fire department while other fire department calls would be rejected.

In a further embodiment, where call information database 144 is shared on the social network platform, CCS 142 may determine whether to accept or reject the call by calculating a probability the user will accept the call based on corresponding rejection rates assigned to topic sequence (each topic and subtopic of that topic by other users). For example, CCS 142 receives the following information regarding the topic "telemarketing-auto insurance" from call information database 144 where 60% of all the users rejected the call, and within this topic, there are further subtopic breakdown of 50% of users rejected the call if the call was related to "risk due to change to local law", 30% of the users rejected the call if the call subtopic related to "change to premium", 20% of the users rejected the call if the call subtopic related to "better coverage". If the user has previously accepted a call from an insurance company about premiums, then CCS 142 would not take the main topic percentage as an input to decide whether to reject or accept the call because "change to premium" might be of interest to the user. Instead, CCS 142 will calculate the rejection rate based on a combination of "risk due to change to local law" and "better coverage", which equate to 48% (60% multiplied by 50%+30%) as an estimation of the call rejection rate.

In another embodiment CCS 142 may analyze the speech by a caller and break it into segments. For example, if the caller introduces that his name is Patrick, states that he is calling about a change of policy of user's auto insurance, and states why this is important to a user, and then asks the user to call back. This sequence of topics, timing between the topics and division into topics and subtopics may be extracted by CCS 142 and is described in further detail below with regard to FIG. 2B.

Figure 2A:
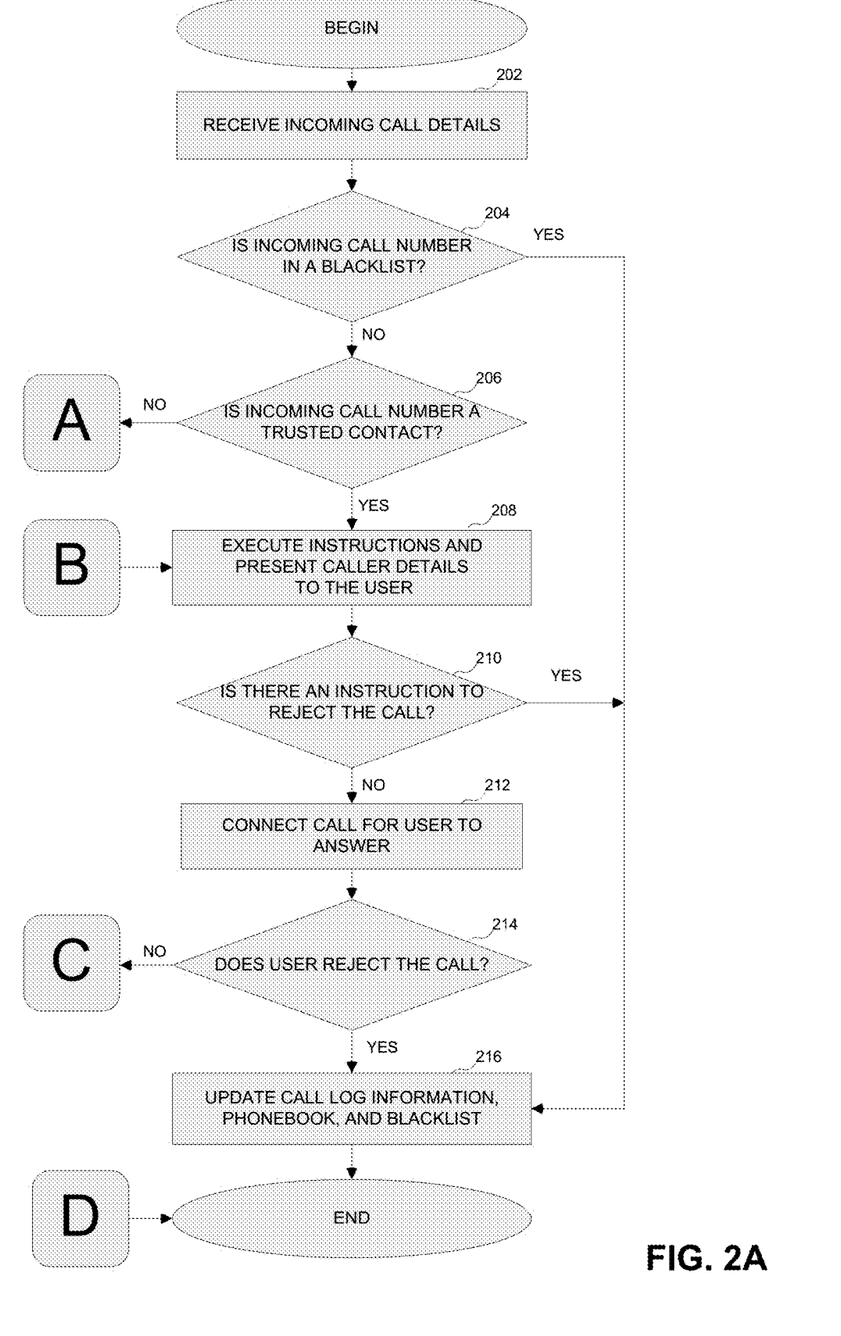
FIG. 2A is a flowchart illustrating operations of the Call Screening Program of FIG. 1, in accordance with an embodiment of the invention.

FIG. 2A is a flowchart illustrating the operations of call screening program 112, in accordance with an embodiment of the invention. Call screening program 112 is a software program configured to screen incoming calls by utilizing cognitive computer service 142 for user preferred decision making.

Referring to step 202, call screening program 112 receives incoming caller details. Typically, any incoming call when received, includes additional caller details. Caller details may include caller phone number, caller name, caller email, caller identification (in case of VOIP call), or other caller identification that is transferred with a call. For example, if the incoming call is transferred through the Internet, call screening program 112 will receive an email address of the caller instead of a phone number. According to an example embodiment, call screening program 112 receives a caller phone number for a fuzzy logic decision whether to transfer the call to a user, transfer the call to a CCS 142, or to disconnect the call. For example, the user may define that if the caller details correspond to a record (an account) in blacklist 114, call screening program 112 will disconnect the call; and in all other scenarios call screening program 112 will transfer the call to CCS 142 that analyzes caller details and makes a decision based on various values calculated based on weighting available caller details. In another embodiment, call screening program 112 may receive other identification information, such as internet protocol (IP) address, media access control (MAC) address or any other data used for caller identification.

Referring to decision 204, call screening program 112 determines whether the incoming call number is on a blacklist 114, based on comparing incoming caller details to the entries (accounts) recorded in the blacklist 114. According to an example embodiment, call screening program 112 compares the received caller details to a blacklist 114 to identify that a communication from the caller should be rejected. As previously described, a blacklist 114 is a database or a list that contains information relating to unwanted callers. If the incoming caller details identify a caller on the blacklist 114 (decision 204, "YES" branch), call screening program 112 proceeds to step 216. If the call number is not in the blacklist 114 (decision 204, "NO" branch), call screening program 112 proceeds to decision 206.

Referring to decision 206, call screening program 112 determines whether an incoming call number is from a trusted caller. According to an example embodiment, trusted callers are stored in phonebook 118. As previously described, phonebook 118 may store fields, such as phone number, email, name, voice signature template, topic, subtopic, and user occupation. According to an example embodiment, whenever call screening program 112 finds that the caller details are corresponding to an account in phonebook 118 (decision 206, "YES" branch), call screening program 112 proceeds to step 208. If the incoming caller details identifying the caller cannot be found in a phonebook 118 (decision 206, "NO" branch), call screening program 112 transfers the call to CCS 142, step 220. In another embodiment, the trusted caller may be identified by CCS 142 that is analyzing extracted caller details by comparing caller details with all the available accounts recorded in call log information 116 or call information database 144 that is stored on a social network platform. For example, a voice signature may be used in conjunction with a phone number to identify a trusted caller or a trusted caller account.

Referring to step 208, call screening program 112 receives instructions and presents caller details in a report from CCS 142 or caller details if they are found in phonebook 118. According to an example embodiment, call screening program 112 executes the instructions that either reject a call or suggest to a user to accept it, providing information about the caller, such as caller name, reason for a call, whether the caller is a spammer, and whether user voice signature is recognized.

According to an example embodiment, call screening program 112 formats and presents a summary of the caller details to the user in accordance to user determined format and recommendations of whether to update any of the databases according to CCS 142 analysis, whether to accept the call, or why the call was rejected. According to an example embodiment, call screening program 112 displays the summary on a touchscreen of a smartphone 110. In another embodiment, call screening program 112 waits for the user to provide a response to the displayed summary through user interactions with the touchscreen of the smartphone 110 before executing the instructions whether to reject the call. In further embodiment, call screening program 112 may use a text-to-speech feature to verbally present the summary to the user and wait for the user's verbal or physical response. The summary may include user identification information that the user determined as relevant from the caller details account associated with the caller. For example, if the user determined that call screening program 112 will display only a topic and the name of the caller, and the caller summary identifies John Doe as the caller and the topic is advertisement, then call screening program 112 will present "John Doe" and "advertisement" and suggest whether to accept or reject the call or a statement that the call was rejected. According to an example embodiment, call screening program 112 may present the summary either by displaying on a screen or by voice via speaker. In alternative embodiment, call screening program 112 may transfer the call to a user if the report includes a recommendation to accept the call. In further embodiment, a report may include an instruction that is a percentage probability to reject a call and a user may define a threshold for accepting or rejecting a call.

Referring to decision 210, call screening program 112 determines whether there is an instruction to reject the call. According to an example embodiment, CCS 142 transfers an instruction whether to receive or reject a call together with caller details. The instruction may be either a binary (0 or 1) or a percentage that represents a likelihood of rejecting an incoming call. For example, if the user defined in user preferences a threshold value that is more than 65% as a threshold limit to reject an incoming call and the current call has a value of 70%, call screening program 112 will reject the incoming call. If there is an instruction to reject an incoming call (decision 210, "Yes" branch), call screening program 112 proceeds to step 216. If there is an instruction not to reject the incoming call (decision 210, "No" branch), call screening program 112 proceeds to step 212.

Referring to step 212, call screening program 112 connects the call for the user to answer. According to an example embodiment, call screening program 112 displays to the user the name of the caller to the user or, using voice-to-text function, notifies the user to answer the phone call. In other embodiments, the call may be a voice or video conference transferred to smartphone 110 via network 198.

Referring to decision 214, call screening program 112 checks whether the user rejects the incoming call. If the user does not reject the call, call screening program 112 transfers the call to CCS 142 (decision 214, "NO" branch), step C. If the user rejects the call (decision 214, "YES" branch), call screening program 112 proceeds to step 216.

Referring to step 216, call screening program 112 updates call log information 116, phonebook 118 and blacklist 114. According to an example embodiment, call screening program 112 adds the caller number to a blacklist 114 if the user disconnects the call several times without accepting the call. In other embodiments, call screening program 112 may analyze the transcript received from CCS 142, and suggest to the user to update call log information 116, such as add a restricted topic if the user, for example, requested the caller not to call again during the conversation. Additionally, the call screening program 112 may suggest to add the voice signature to call log information 116 in order to identify the caller even if the caller calls from another phone number.

Figure 2B:
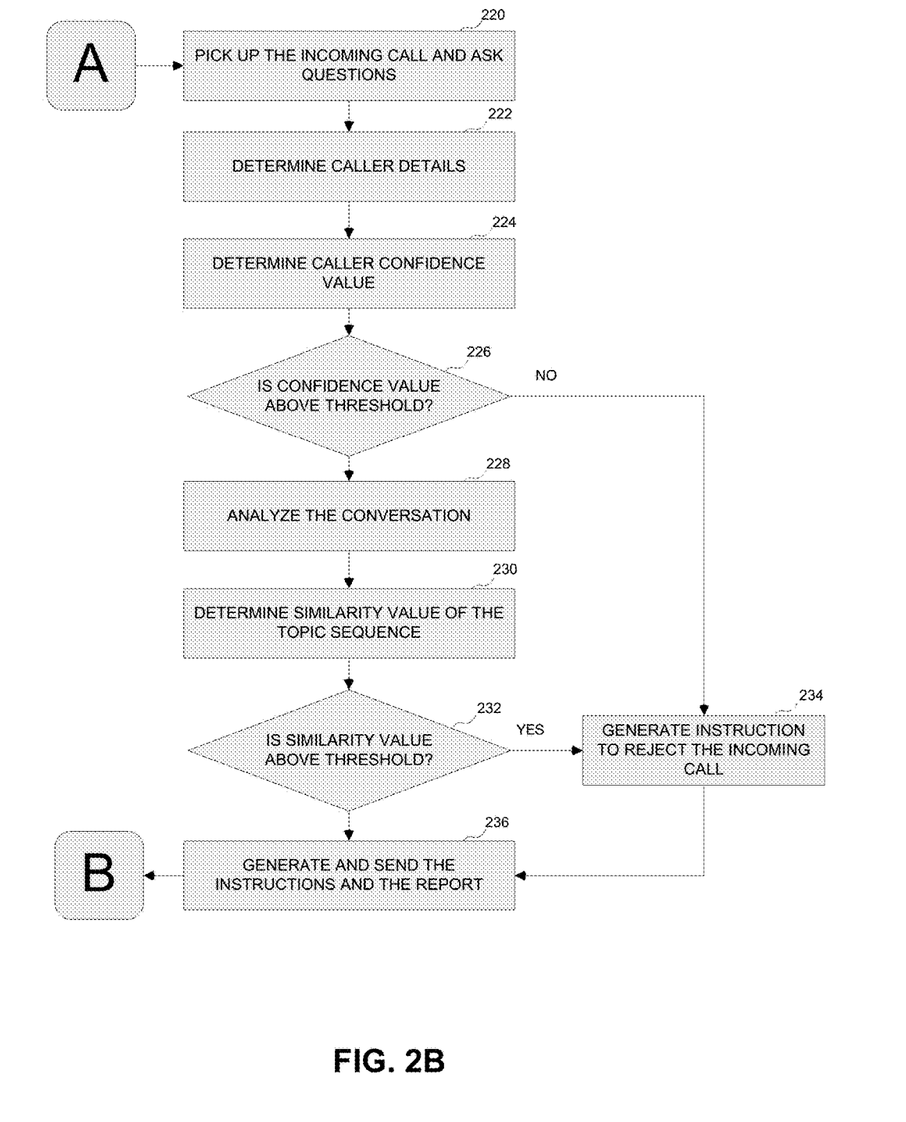
FIG. 2B is a flowchart illustrating operations of the cognitive computing service of FIG. 1, in accordance with an embodiment of the invention.

FIG. 2B is a flowchart illustrating the operations of CCS 142, in accordance with an embodiment of the invention. Referring to step 220, CCS 142 connects to smartphone 110 and picks up the incoming call to ask questions. According to an example embodiment, CCS 142 may ask the caller various questions to identify the name of the caller, the reason for calling (topic and subtopics).

Referring to step 222, CCS 142 determines caller details and caller voice signature using pattern recognizing techniques such as, frequency estimation, hidden Markov models, or Gaussian mixture models. According to an embodiment, CCS 142 uses natural language processing and speech-to-text techniques to convert the caller answers to text and extracts the name of the caller and topic and subtopics from the answers using cognitive computing capabilities by either analyzing the voice or by discovering connections between words and phrases in a transcript of the answers. All the extracted data that includes caller name, rejection percentage (percentage based on available rejecting rate of similar call by other users) reason for a call, user signature and whether the user voice signature is recognized. As previously mentioned, CCS 142 compares extracted data to the data available in call information database 144, blacklist 114, call log information 116, and phonebook 118 to find matches or similarities.

Referring to step 224, CCS 142 analyzes the conversation. As previously mentioned, CCS 142 uses natural language processing and speech-to-text techniques to convert the caller answers to text and extracts the name of the caller and topic and subtopics from the answers using cognitive computing capabilities by either analyzing the voice or by discovering connections between words and phrases in a transcript of the answers. All the extracted data that includes caller name, rejection percentage (percentage based on available rejecting rate of similar call by other users) reason for a call, user signature and whether the user voice signature is recognized. As previously mentioned, CCS 142 compares extracted data to the data available in call information database 144, blacklist 114, call log information 116, and phonebook 118 to find matches or similarities, which may be used to determine further context of the call.

According to an example embodiment, CCS 142 compares extracted voice signature, transcript of the conversation, topic and subtopics to the data available in call information database 144, blacklist 114, call log information 116, and phonebook 118. For example, voice signature may be determined based on a text-dependent or a text-independent speech recognition technique. When CCS 142 extracts a voice signature of the caller it is stored in call information database 144 and call log information 116. The saved voice signature is used to compare with future callers using techniques such as frequency estimation, hidden Markov models, Gaussian mixture models, local spectral variability features, and neural networks.

In another embodiment, CCS 142 may divide the speech into segments such as when the caller introduces himself as Patrick, stating that he is calling about a change of policy of an auto insurance, stating how this call may have an impact, and asks to call back. The sequence of topics, timing between the topics may be represented using a technique such as long short-term memory (LSTM) in a recurrent neural network. The LSTM representation may be stored in call information database 144 and compared to future callers, in order to determine if the current call is similar to one of the previous calls.

Referring to step 224, CCS 142, determines a caller confidence value. According to an example embodiment, to improve caller identification confidence threshold techniques may be used such as a successful identification by the CCS 142 requires 3 or more of the following details to match from the parameters including caller phone number, caller name, caller voice signature, caller topic, caller sequence of topics. In addition, a user may adjust the confidence threshold value such as a risk-adverse user may request a higher confidence level for desired caller and set that more than 3 of the previous details have to match.

Referring to decision 226, CCS 142 determines whether the confidence value of caller identification is above user determined threshold value defined by the user. If determined value is above the threshold value defined by the user in user preferences (decision 226, "Yes" branch), CCS 142 proceeds to step 228. If determined confidence value is below the threshold, CCS 142 proceeds to step 234.

Referring to step 228, CCS 142 analyzes the conversation. According to an example embodiment, CCS 142 may learn from the conversation or a transcript, and determine the essential information to be included in the caller details. For example, CCS 142 may determine the criteria of essential information using a conservative and progressive approach. If the user asks the caller about the product when the previous caller details for the same caller (associated with the same account) show "John Doe" and "Advertisement" fields, the CCS 142 will include product in the generated caller details next time when the call is from John Doe and has a topic of Advertisement. If the call is from Amy Smith about Advertisement, CCS 142 will not include product in the summary. If the user saw the summary from another caller, Amy Smith, about advertisement and asked about the product, then CCS 142 will start to display the product in the generated caller details for the user all the time.

In further embodiment, CCS 142 may learn from the conversation when information requested by the user is not available. Then, CCS 142 will ask for the information for similar calls in the future. For example, the caller stated that he is John Doe, calling about Real Estate. Based on the above example, the summary could display: John Doe, Advertisement, and Real Estate. If the user asks whether John Doe is trying to sell a house to the user, or requests the user to sell his house, then the call screening program 112 will ask for the details in the future. In an embodiment, these types of additional details could be requested from all callers having similar qualities as John Doe (e.g. working with real estate), or requested from only John Doe.

In further embodiments, where call log information 116 is incorporated in call information database 144 and shared and collected from multiple users, call information database 144 may be analyzed for similar topic sequences that were extracted from the current conversation, and prevailing similarities across multiple callers may be identified. For example, if a female caller previously called regarding auto insurance, and a current caller is a male who calls for auto insurance as well, and the topic sequence between these two callers is similar, CCS 142 will include in the caller details an instruction (sends recommendation or a code associated with percentage representing a probability whether to reject the incoming call) to reject the call if a call with a similar topic sequence was rejected by the user in the past. In further embodiments, CCS 142 may determine that the caller's voice is a minor factor in a caller identification, while the topic sequence is a key identification. In addition, corresponding weight may be assigned to the voice signature and topic sequence and the combined value used to reject or accept the call. For example, a different voice signature does not reduce the weight (combined value), while a matching signature would increase the combined value representing that the callers are identical and should have the same treatment as a previous call stored in call log information 116.

Referring to step 230, CCS 142 determines similarity value between the current incoming call topic sequence and previous calls topic sequences stored in call information database 144 and call log information 116. According to an example embodiment, an average weight may be generated based on comparing independent topics within a topic sequence extracted by the CCS 142. For example, caller A topic sequence is (A, B, C, D, E) may be compared to a current caller sequence (A, B, X, Y, E) and CCS 142 may determine that 3 out of 5 subtopics are the same. A similarity value may be calculated, such as 3 divided by 5, or 60%, and may be used by CCS 142 in calculating the recommendation to accept or reject the call. For example, if previous call was recorded as a spam call, the current call has a rejection probability of 60% and if it is above the threshold determined by the user the call will be disconnected.

Referring to decision 232, CCS 142 determines whether similarity value of the topic sequence is above a user defined threshold value defined by the user. According to an example embodiment, CCS 142 compares extracted topic sequence to other topic sequences stored in call information database 144 and call log information 116. If a determined similarity value is above the user determined threshold value defined in user preferences by the user and the topic sequence is associated with a spam caller (decision 232, "Yes" branch), CCS 142 proceeds to step 234. If a similarity value is below threshold value defined in user preferences by the user, CCS 142 proceeds to step 236.

Referring to step 234, CCS 142 generates instructions to reject the incoming call. According to an example embodiment, CCS 142 may generate either a weighted value that combines the confidence value with a similarity value. In other embodiment, CCS 142 may determine the instruction to reject an incoming call based on the highest value among the values. In an alternative embodiment, the rejected call may include sending the call directly to voice mail, or restricting the call to a text message.

Referring to step 236, CCS 142 generates and sends the instructions and the caller details to call screening program 112. As previously mentioned, the instructions to reject the incoming call may be either binary (accept or reject) or a percentage value whether to reject the call or both. If the summary includes topics, such as name, phone number or other identifier previously restricted by the user, call screening program 112 may be configured to disconnect the call even if there is no generated instruction to reject the incoming call.

Figure 2C:
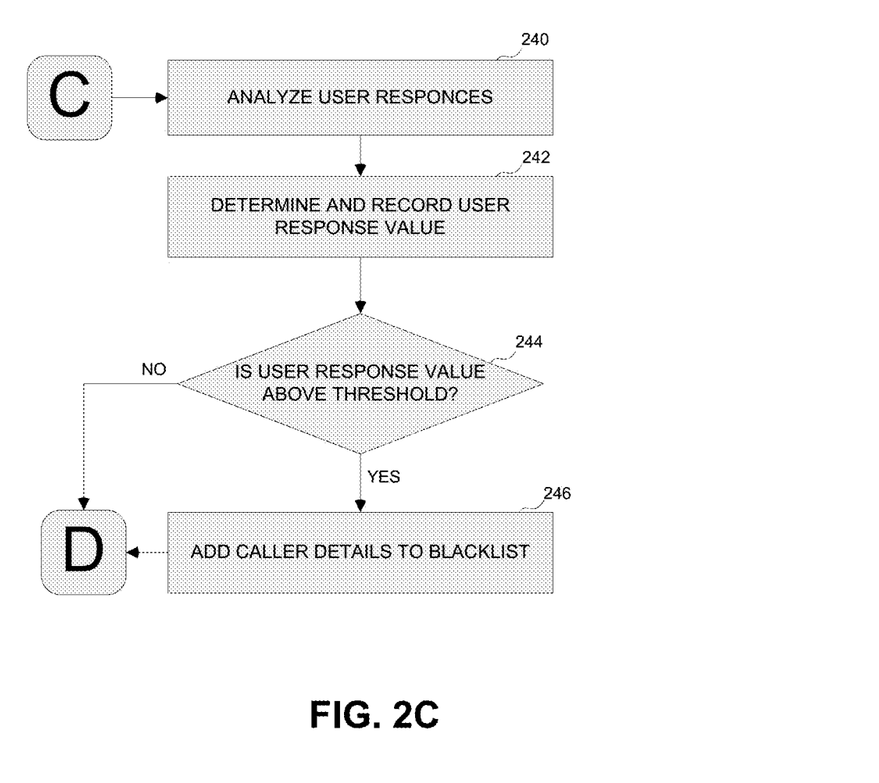
FIG. 2C is a flowchart illustrating further operations of the cognitive computing service, in accordance with an embodiment of the invention.

FIG. 2C is a flowchart illustrating further operations of CCS 142, in accordance with an embodiment of the invention. Referring to step 240, CCS 142 analyzes user responses. According to an example embodiment, CCS 142 monitors and analyzes user responses, such as whether the user accepts or rejects the call, or hangs up after a short period of time, and analyzes the conversation and user physical responses during the conversation, such as if the user disconnected the incoming call within a short time after viewing caller details or a short time after answering a call. Disconnecting the call after a short conversation time or rejecting a call altogether may indicate a user's intent to add the phone number to a blacklist 114. In addition, CCS 132 may determine the reason that triggered the user physical response, such as caller name or a topic and update the caller details in a corresponding account stored in call log information 116 and call information database 144. For example, if the caller name was the reason for disconnecting the call, CCS 142 may further determine caller voice signature and suggest to add the user to a blacklist 114.

Referring to step 242, CCS 142 determines a user response value that is stored in call log information 116 or call information database 144 or both. The CCS 142 response threshold may be user defined and configured to a specific response value in user preferences. The response value may be calculated for example, by adding 1 to the response value of the corresponding caller any time when the user rejected a call from the caller by pressing an end call button, adding 10 to the response value when a user hang up the call within several seconds after hearing the voice of the caller and adding 100 to the response value every time when the user response showed intent that he never wants to speak to the caller again. The user may define a minimum threshold value that when reached the caller details are added to the blacklist 114.

Referring to decision 244, CCS 142 determines whether user response value is above a threshold value defined by a user. If the response value is above the threshold (decision 244, "Yes" branch) defined in user preferences by the user, CCS 142 proceeds to step 246. If the response value is below threshold value defined in user preferences (decision 224, "No" branch), CCS 142 proceeds to step D.

Referring to step 246, CCS 142 adds caller details to blacklist 114. According to an example embodiment, CCS 142 adds all the caller details to a databases and marks the caller as a spammer. In other embodiments, CCS 142 may emphasize the topic sequence as related to spam calls and if future calls are similar to the topic sequence they will be rejected.

Figure 3:
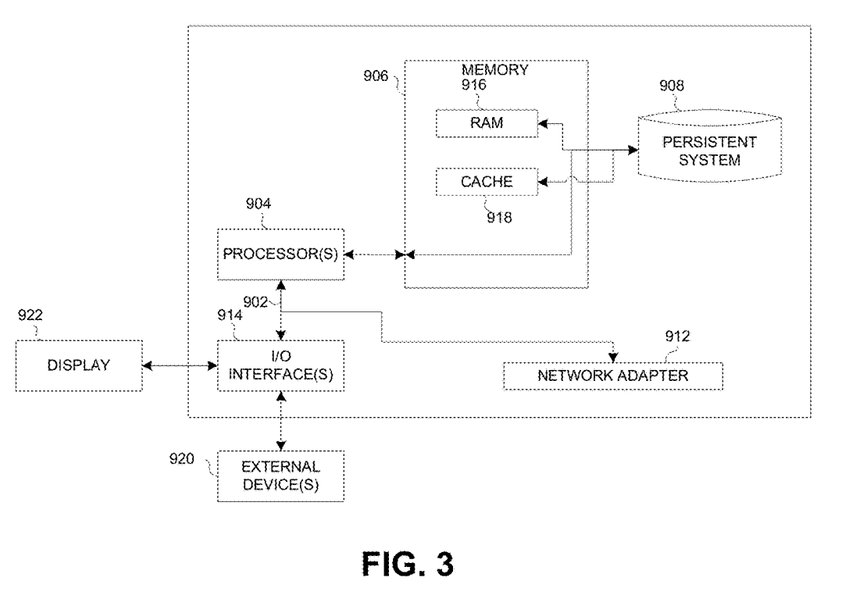
FIG. 3 is a block diagram depicting the hardware components of the ICS system of FIG. 1, in accordance with an embodiment of the invention.

FIG. 3 depicts a block diagram of components of smartphone 110 and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

A smartphone 110 and a server 140 include communications fabric 902, which provides communications between computer processor(s) 904, memory 906, persistent storage 908, communications unit 912, and input/output (I/O) interface(s) 914. Communications fabric 902 may be implemented with any architecture designed for passing data and/or control information between processors (such as microprocessors, communications and network processors, etc.), system memory, peripheral devices, and any other hardware components within a system. For example, communications fabric 902 may be implemented with one or more buses.

Memory 906 and persistent storage 908 are computer-readable storage media. In this embodiment, memory 906 includes random access memory (RAM) 916 and cache memory 918. In general, memory 906 may include any suitable volatile or non-volatile computer-readable storage media.

Call screening program 112 is stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is part of persistent storage 908.

Communications unit 912, in these examples, provides for communications with other data processing systems or devices. In these examples, communications unit 912 includes one or more network interface cards. Communications unit 912 may provide communications using one or both of physical and wireless communications links. Call screening program 112 may be downloaded to persistent storage 908 through communications unit 912.

I/O interface(s) 914 allows for input and output of data with other devices that may be connected to smartphone 110 and server 140. For example, I/O interface 914 may provide a connection to external devices 920 such as a keyboard, keypad, a touch screen, and/or some other suitable input device. External devices 920 may also include portable computer-readable storage media such as, for example, thumb drives, portable optical or magnetic disks, and memory cards. Software and data used to practice embodiments of the present invention, e.g., call screening program 112 may be stored on such portable computer-readable storage media and may be loaded onto persistent storage 908 via I/O interface(s) 914. I/O interface(s) 914 may also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
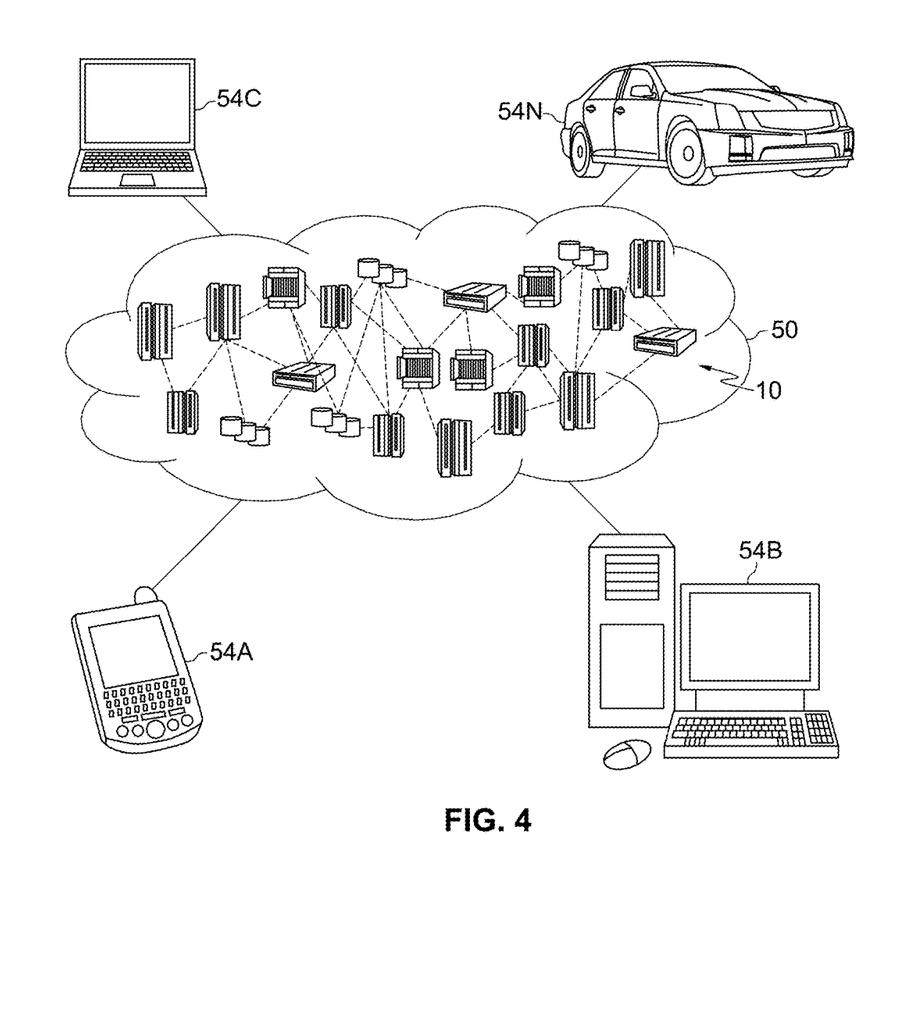
FIG. 4 depicts a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 may communicate with any type of computerized device over any type of network and/or network addressable connection (e.g., using a web browser).

Figure 5:
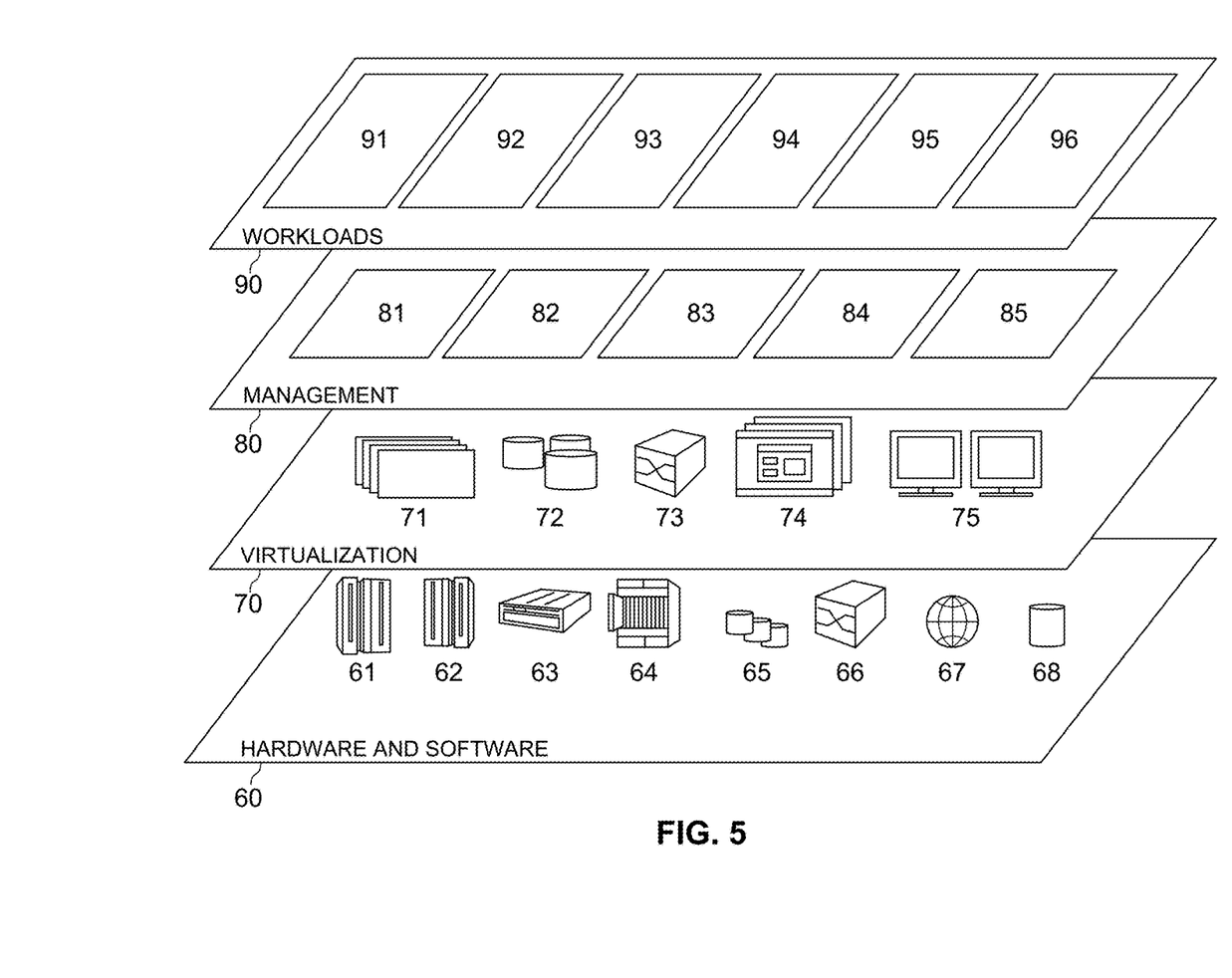
FIG. 5 depicts abstraction model layers, in accordance with an embodiment of the invention.

Referring now to FIG. 5, a set of functional abstraction layers provided by cloud computing environment 50 (FIG. 1) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intelligent call screening 96. Intelligent call screening 96 may relate to functionality that receives an incoming call, classifies whether to block, to accept, or to initiate a conversation between the platform and a caller (in order to identify the caller and the reason for a call), and decides or recommends to accept or reject the incoming call.

What is claimed is:

1. A method for an intelligent call screening, the method comprising:
   receiving an incoming call by a cognitive computing service;
   determining, by the cognitive computing service, from caller details that the incoming call is not within intended recipient preferences, based on comparing the caller details to a call log information database and a call information database, wherein the call log information database and call information database comprise previous caller details;
   referencing, by the cognitive computing service, additional caller details from the call log information database and call information database relating to the caller details;
   determining whether an intended recipient of the incoming call would reject the incoming call, wherein determining whether the intended recipient of the incoming call would reject the incoming call is based on determining whether a confidence value is below a threshold value;
   rejecting the incoming call based on determining that the intended recipient of the incoming call would reject the incoming call, wherein determining whether the intended recipient of the incoming call would reject the incoming call based on determining whether a similarity value is above a threshold; and
   displaying a summary of the caller details to the intended recipient based on determining that a voice signature matches a stored voice signature.

2. The method of claim 1, wherein the call information database is shared on a social network platform and comprises an incoming call identification, a topic sequence and corresponding values representing call rejection values for each topic in the topic sequence, and an identification of whether a caller is tagged as a spammer.

3. The method of claim 2, further comprising:
   determining a user rejection rate based on rejections by other intended recipients to the corresponding topic sequence from the call information database; and
   rejecting the incoming call based on determining that a similarity value is above a threshold value of the user rejection rate.

4. The method of claim 1, further comprising:
   analyzing an intended recipient response, by the cognitive computing service;
   determining, by the cognitive computing service, a response value based on the intended recipient response to the incoming call;
   determining whether the response value is above a minimum threshold value;
   based on determining that the response value is above a minimum threshold value, adding the caller details to a blacklist;
   receiving a second incoming call; and
   based on determining that caller details of the second incoming call match caller details of the incoming call added to the blacklist, rejecting the second incoming call.

5. The method of claim 1, wherein determining whether the intended recipient of the incoming call would reject the incoming call comprises:
   determining whether a confidence value is below a threshold value, wherein the confidence value is determined by comparing identification parameters of caller details from the incoming call that match an individual account from the call information database; and
   rejecting the incoming call based on determining that the confidence value is below the threshold value.

6. The method of claim 1, wherein determining whether the intended recipient of the incoming call would reject the incoming call comprises:
   determining whether a similarity value is above a threshold, wherein the similarity value is determined by comparing a topic sequence for the incoming call to the topic sequence for a previously rejected call; and
   rejecting the incoming call based on determining that the similarity value is above the threshold.

7. The method of claim 1, wherein determining whether the intended recipient of the incoming call would reject the incoming call comprises:
   determining that the intended recipient response value is above a threshold value, wherein the intended recipient response value is determined from the caller details.

8. A computer program product stored on a non-transitory tangible computer-readable storage device for an intelligent call screening, the computer program product comprising:
   one or more computer-readable storage devices and program instructions stored on at least one of the one or more tangible storage devices, the program instructions comprising:
   program instructions to receive an incoming call by a cognitive computing service;
   program instructions to determine, by the cognitive computing service, caller details that the incoming call is not within intended recipient preferences, based on comparing the caller details to call log information database and call information database, wherein the call log information database and call information database comprises previous caller details;
   program instructions to reference, by the cognitive computing service, additional caller details from the call log information database and call information database relating to the caller details;
   program instructions to determine whether an intended recipient of the incoming call would reject the incoming call, wherein program instructions to determine whether the intended recipient of the incoming call would reject the incoming call is based on program instructions to determine whether a confidence value is below a threshold value;

program instructions to reject the incoming call based on determining that the intended recipient of the incoming call would reject the incoming call, wherein determining whether the intended recipient of the incoming call would reject the incoming call based on determining whether a similarity value is above a threshold value; and program instructions to display a summary of the caller details to the intended recipient based on determining that a voice signature matches a stored voice signature.

9. The computer program product of claim 8, wherein the call information database is shared on a social network platform and comprises an incoming call identification, topic sequence and corresponding values representing call rejection values for each topic in the topic sequence, and identification whether a caller tagged as a spammer.

10. The computer program product of claim 9, wherein the program instructions further comprise:

program instructions to determine a user rejection rate based on rejections by other intended recipients to the corresponding topic sequence from the call information database; and program instructions to reject the incoming call based on determining that a similarity value is above threshold value of the user rejection rate.

11. The computer program product of claim 8, wherein the program instructions further comprise:

program instructions to analyze an intended recipient response, by the cognitive computing service;

program instructions to determine, by the cognitive computing service, a response value based on the intended recipient response to the incoming call;

program instructions to determine whether the response value is above a minimum threshold value; and based on determining that the response value is above a minimum threshold value, program instructions to add the caller details to a blacklist;

program instructions to receive a second incoming call, based on determining caller details of the second incoming call match caller details of the incoming call added to the blacklist, program instructions to reject the second incoming call.

12. The computer program product of claim 8, wherein the program instructions to determine whether the intended recipient of the incoming call would reject the incoming call comprise:

program instructions to determine that a confidence value is below threshold value, wherein the confidence value is determined by comparing identification parameters of caller details from the incoming call that match an individual account from a call information database; and program instructions to reject the incoming call based on determining that the confidence value is below threshold.

13. The computer program product of claim 8, wherein the program instructions to determine whether the intended recipient of the incoming call would reject the incoming call comprise:

program instructions to determine that a similarity value is above threshold wherein the similarity value is determined by comparing a topic sequence for the incoming call to the topic sequence for a previously rejected call; and program instructions to reject the incoming call based on determining that the similarity value is above threshold.

14. The computer program product of claim 8, wherein the program instructions to determine whether the intended recipient of the incoming call would reject the incoming call comprise:

program instructions to determine that the intended recipient response value is above threshold value wherein the intended recipient response value is determined from the caller details.

15. A computer system for an intelligent call screening, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to receive an incoming call by a cognitive computing service;

program instructions to determine, by the cognitive computing service, caller details that the incoming call is not within intended recipient preferences, based on comparing the caller details to call log information database and call information database, wherein the call log information database and call information database comprises previous caller details;

program instructions to reference, by the cognitive computing service, additional caller details from the call log information database and call information database relating to the caller details;

program instructions to determine whether an intended recipient of the incoming call would reject the incoming call, wherein program instructions to determine whether the intended recipient of the incoming call would reject the incoming call is based on program instructions to determine whether a confidence value is below a threshold value;

program instructions to reject the incoming call based on determining that the intended recipient of the incoming call would reject the incoming call, wherein determining whether the intended recipient of the incoming call would reject the incoming call based on determining whether a similarity value is above a threshold value; and program instructions to display a summary of the caller details to the intended recipient based on determining that a voice signature matches a stored voice signature.

16. The computer system of claim 15, wherein the call information database is shared on a social network platform and comprises an incoming call identification, topic sequence and corresponding values representing call rejection values for each topic in the topic sequence, and identification whether a caller tagged as a spammer.

17. The computer system of claim 15, wherein the program instructions further comprise:

program instructions to analyze an intended recipient response, by the cognitive computing service;

program instructions to determine, by the cognitive computing service, a response value based on the intended recipient response to the incoming call;

program instructions to determine whether the response value is above a minimum threshold value; and based on determining that the response value is above a minimum threshold value, program instructions to add the caller details to a blacklist;

program instructions to receive a second incoming call, based on determining caller details of the second incoming call match caller details of the incoming call added to the blacklist, program instructions to reject the second incoming call.

18. The computer system of claim 15, wherein the program instructions to determine whether the intended recipient of the incoming call would reject the incoming call comprise:

program instructions to determine that a confidence value is below threshold value, wherein the confidence value is determined by comparing identification parameters of caller details from the incoming call that match an individual account from a call information database; and program instructions to reject the incoming call based on determining that the confidence value is below threshold.

19. The computer system of claim 15, wherein the program instructions to determine whether the intended recipient of the incoming call would reject the incoming call comprise:

program instructions to determine that a similarity value is above threshold wherein the similarity value is determined by comparing a topic sequence for the incoming call to the topic sequence for a previously rejected call; and program instructions to reject the incoming call based on determining that the similarity value is above threshold.

20. The computer system of claim 15, wherein the program instructions to determine whether the intended recipient of the incoming call would reject the incoming call comprise:

program instructions to determine that the intended recipient response value is above threshold value wherein the intended recipient response value is determined from the caller details; and program instructions to display a summary of the caller details to the intended recipient based on determining a voice signature matches a stored voice signature.

* * * * *